W. LUCAS.
CIDER MAKER.
No. 72872
PATENTED DEC 31 1867
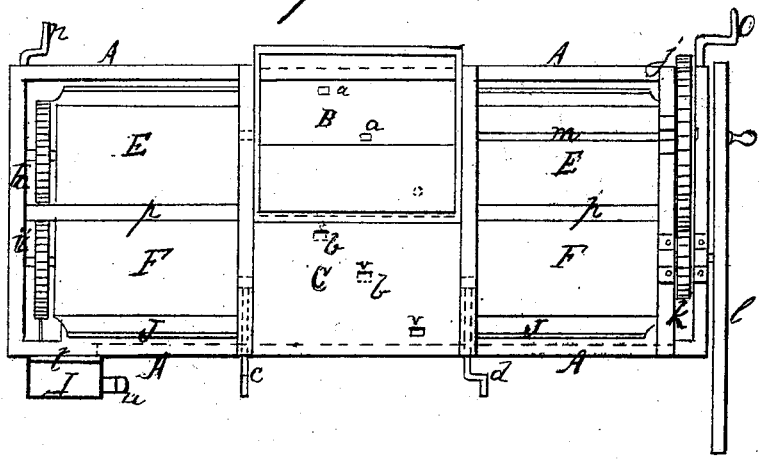
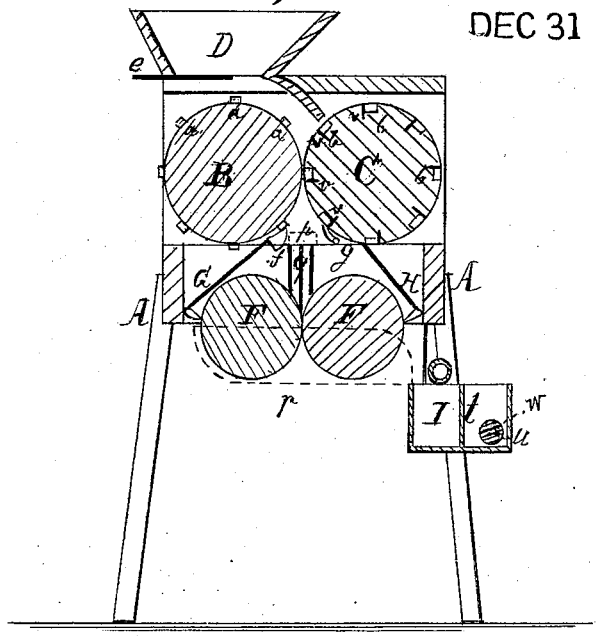

United States Patent Office.

WILLIAM LUCAS, OF RUSHVILLE, ILLINOIS.

Letters Patent No. 72,872, dated December 31, 1867.

IMPROVED MACHINE FOR MAKING CIDER.

*The Schedule referred to in these Letters Patent and making part of the same.*

TO ALL WHOM IT MAY CONCERN:

Be it known that I, WILLIAM LUCAS, of Rushville, in the county of Schuyler, and State of Illinois, have invented certain new and useful Improvements in a Machine for Making Cider or Wine; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention relates to cider-mills, and consists of a new and improved arrangement for crushing the apples and squeezing the pomace, all combined in the same machine. In the drawings- Figure 1 is a top plan view.

Figure 2 is a transverse sectional view on the line $x\ x$ of fig. 1, and

Figure 3 is an end view of a crushing-roller, of different form from the one shown in fig. 1.

In constructing my cider-mill, I make a strong frame, A, and mount in its upper side two strong crushing-rollers, B C, longitudinally, as shown in figs. 1 and 2. These rollers I make about one-third of the length of the frame A, and of metal or wood, as may be desired. One of these rollers, B, I provide with projecting teeth, $a$, and the other with sockets, $b$, into which the teeth $a$ fit. These rollers I set so that the teeth $a$, playing or fitting into the sockets $b$, cause them to revolve together. When the wheel or rollers are made of wood, I line the side of the sockets $b$, against which the teeth $a$ strike, with iron plate, $v$, so as to make them more durable. The roller B, which is provided with the teeth $a$, is the feed-roller, and in turning revolves the other. In the place of rollers constructed in this way, fluted rollers, arranged so as to mesh into each other, of the form shown in fig. 3, may be used. On one side of the frame A, and on a line with the axes of the rollers B C, I place two set-screws, $c\ d$, as shown in fig. 1, by which to adjust the rollers B C at any desired distance from each other. Above the rollers B C, I place a hopper, D, provided with a slide, $e$, so as to regulate the feed. Under the rollers B C, I place two scrapers, $f\ g$, so as to bear closely against them, as shown in fig. 1. The scraper, $f$, which bears against the roller B, I provide with grooves, to allow the teeth $a$ to pass it. Immediately under the rollers B C for crushing, I mount, longitudinally, and parallel with them and with each other, the rollers E F, in the same frame A, in bearings provided for the purpose. These rollers E F, I make of felt or rubber, placed over a wood or iron cylinder having an iron axle. When made of rubber, I take rubber tubing and stretch it over the cylinder, and fasten it in a suitable manner at either end with iron caps. The rollers E F extend the whole length of the frame, and have cog or gear-wheels, $h\ i$, gearing into each other, as shown in fig. 1. The roller F has a cog-wheel at its opposite end, which gears into the cog-wheel $j$ which gears into the pinion $k$, which is turned by the fly-wheel $l$ to which the power is applied. The cog-wheel $j$ communicates motion by the shaft $m$ to the crushing-roller B. From the under side of the frame supporting the rollers B C, I suspend the scrapers G H, which rest against the sides of the rollers E F, as shown in figs. 1 and 2, and press against them with their weight. The rollers E F, I call the press-rollers, and provide them with set-screws, $n\ o$, for adjusting at any desired distance from each other. Between the upper part of the frame, in which the rollers B C are mounted, and the ends of the main frame, I place bars $p$, having bent pieces of heavy wire, $q$, extending downwards against the rollers E F, as shown in fig. 2. Under each end of the rollers E F, I place a trough, $r$, as shown by the blue lines in fig. 2. At one end this trough empties directly into the separator I, at the other it is connected to a pipe, J, which empties into the separator I. The separator I, I make in the form of a rectangular box, as shown in fig. 2, and of any suitable material. In the centre of it I place a perforated zinc partition, $t$, and at one side a spout, $u$, and in this spout I place loosely a sponge, $w$.

In operating my mill, I throw the apples into the hopper D, and regulate the flow or feed by means of the slide $e$. I then turn the fly-wheel $l$, which communicates motion, as described, to the crushing-wheels or rollers B C, and to the pressing-rollers E F. As the apples are drawn between the rollers B C, they are crushed. The pomace into which they are thus made falls on to the pressing-rollers E F, and is drawn between them and pressed. The juice or liquid flows off towards the ends of the rollers, and runs into the trough $r$, then into the separator I, through the partition $t$, and out through the sponge $w$ in the spout $u$. The degree of crushing desired, as well as the amount of pressing, I regulate by means of the set-screws $c\ d$ and $n\ o$. In the progress of the operation the scrapers $f\ g$ keep the crushing-rollers B C clean, and the scrapers G H perform the same function for the pressing-rollers E F, and the guards or hooks $q$ prevent the pomace from working out towards the ends of the rollers.

As the gearing is arranged in this mill, it will be noticed that the power may be applied either to the fly-wheel $l$, or by means of a crank to the end of the pressing-roller E, at the end of the frame opposite to that at which the driving-wheel $l$ is placed. When the pressing-wheel F is turned, the cog-wheel $h$ gears into the wheel $i$ attached to the pressing-roller F, at the opposite end of which is a cog-wheel, which gears into the wheel $j$, which, by means of its connecting-shaft $m$, turns the crushing-roller B.

As the crushing and pressing-rollers can be adjusted at any desired distance from each other, and as the fluted crushers may be substituted, it is obvious that my mill may be readily adapted to pressing grapes, rhubarb, berries, or any similar substances or articles.

It is always ready for use. As the pressing is done immediately after the crushing, all of the liquid is promptly secured.

Having thus described my invention, what I claim is—

1. The metal plate $v$ in the sockets $b$, when arranged as described and for the purposes set forth.

2. The combination of the crushing-rollers B C, pressing-rollers E F, guards $q$, troughs $r\ r$, spout J, and strainer I, when arranged to operate as shown and described.

WILLIAM LUCAS.

Witnesses:
AUGS. WARREN,
WM. H. BAKER.